(12) United States Patent
Fitzpatrick et al.

(10) Patent No.: US 12,335,323 B2
(45) Date of Patent: Jun. 17, 2025

(54) DEVICES, SYSTEMS AND METHODS FOR VIDEO PROCESSING

(71) Applicant: Reincubate Limited, London (GB)

(72) Inventors: Aidan Fitzpatrick, London (GB); Ayden Panhuyzen, London (GB); Jamie Bishop, London (GB)

(73) Assignee: Reincubate Limited (GB)

( * ) Notice: Subject to any disclaimer, the term of this patent is extended or adjusted under 35 U.S.C. 154(b) by 0 days.

(21) Appl. No.: 18/425,741

(22) Filed: Jan. 29, 2024

(65) Prior Publication Data
US 2024/0171623 A1 May 23, 2024

Related U.S. Application Data

(63) Continuation of application No. 17/534,738, filed on Nov. 24, 2021, now Pat. No. 11,924,258.

(30) Foreign Application Priority Data

Dec. 23, 2020 (GB) ..................................... 2020571
Jul. 14, 2021 (GB) ..................................... 2110144

(51) Int. Cl.
*H04L 65/4038* (2022.01)
*G06T 7/50* (2017.01)
(Continued)

(52) U.S. Cl.
CPC ............ *H04L 65/4038* (2013.01); *G06T 7/50* (2017.01); *H04N 5/77* (2013.01); *H04N 23/631* (2023.01);
(Continued)

(58) Field of Classification Search
CPC ... H04L 65/4038; H04N 23/80; H04N 23/631
(Continued)

(56) References Cited

U.S. PATENT DOCUMENTS 7,548,645 B2 6/2009 Iida et al.
10,834,358 B1 * 11/2020 Harrison .............. H04N 5/2628
(Continued)

FOREIGN PATENT DOCUMENTS

JP 4463952 B2 5/2010

OTHER PUBLICATIONS

UK Examiner Report for Application No. GB2110144.9 dated Apr. 25, 2022, 5 pages.
(Continued)

*Primary Examiner* — Amal S Zenati
(74) *Attorney, Agent, or Firm* — Endurance Law Group PLC; James R. Yee

(57) ABSTRACT

Video processing devices, systems and methods are disclosed. A control device, a capture device, and at least one cooperation application are provided. The cooperation application configures the capture device and control device to communicatively pair for cooperation with one another to perform a video processing operation. The cooperation application determines a split of video processing tasks between the capture device and the control device. A first set of video processing tasks are performed by the capture device, and a second set of video processing task are performed by the control device.

21 Claims, 4 Drawing Sheets

(51) Int. Cl.
*H04N 5/77* (2006.01)
*H04N 23/63* (2023.01)
*H04N 23/951* (2023.01)

(52) U.S. Cl.
CPC . *H04N 23/951* (2023.01); *G06T 2207/10016* (2013.01)

(58) Field of Classification Search
USPC ...................................... 348/14.03
See application file for complete search history.

(56) References Cited

U.S. PATENT DOCUMENTS

2006/0290960 A1    12/2006  Matsuhira
2016/0149722 A1*  5/2016  Yamanishi ............ H04W 60/04
                                                  348/143
2020/0045267 A1    2/2020   Carey

OTHER PUBLICATIONS

UK Letter of intention to grant for Application No. GB2110144.9 dated Jan. 23, 2023, 2 pages.
UK Letter of Notification to grant for Application No. GB2110144.9 dated Feb. 23, 2023, 2 pages.
UK Search Report for Application No. GB2110144.9 dated Apr. 21, 2022, 2 pages.

* cited by examiner

DEVICES, SYSTEMS AND METHODS FOR VIDEO PROCESSING

CROSS REFERENCE TO RELATED APPLICATIONS

This application is a continuation application of U.S. patent application Ser. No. 17/534,738, filed on Nov. 24, 2021, which claims priority to UK Patent Applications GB 2020571.2 filed on Dec. 23, 2020 and GB 2110144.9 filed on Jul. 14, 2021, the entire disclosures of which are hereby incorporated by reference and relied upon.

BACKGROUND

Technical Field

The present invention relates to devices, systems and methods for video processing, in particular for video conferencing, streaming, and other real-time video communications. In particular, the present invention relates to capturing, processing and enhancing video in a manner supportive of and suitable for the purposes of real-time video communication.

Business and consumer computing devices such as laptops are often provided with an integrated microphone and a rudimentary forward-facing camera ("webcam") that is close to and has an optical axis aligned with that of the electronic display unit of the computing device. This allows each user to simultaneously face both the visual input device (i.e. the webcam) and output device (i.e. display unit), thereby facilitating face-to-face video-conferencing with other participants.

The camera in particular is often a relatively low-cost component having properties such as a small digital sensor size, which leads to trade-offs being made in terms of the versatility of operation of the camera. One trade-off is that such basic webcams have a fixed and long depth-of-field (DOF). This allows a scene within the field of view camera to remain in focus, regardless of whether it is in the foreground or background. Whilst this is acceptable for a number of use-cases, a long DOF can present problems in certain situations particular to the use of the camera during video-conferencing. Typically, many users of video-conferencing would often prefer to keep themselves in focus in the foreground, and the background out of focus or eliminated to maintain their privacy, or otherwise avoid transmitting distracting or inappropriate images to other participants of a video conference.

To address this need, it is possible to apply image processing techniques that attempt to distinguish between the background and the foreground of a video stream, and apply a blurring effect to the background. Such image processing techniques must operate in real-time, using the constrained computing resources of the computing device, and so are limited in their effectiveness. In many cases they are not satisfactory, often leading to jarring effects to the video stream, with the user in the foreground often having an irregular "cut-out" appearance. Also, the enabling of such image processing techniques often overload the processor of the computing device, raising its temperature, resulting in the cooling fan of the computing device to work more intensely. This is noisy, and interferes with the audio of a video conferencing session. The computer may even slow to the point where other tasks are difficult, and this can also affect the performance of the video call.

Another issue relates to the restricted availability of bandwidth. Bottlenecks on network paths between the participants of a video conference often cause interruptions to the video streams sent and received between each participant. In such circumstances, it is known to implement throttling routines that reduce the bitrate of the video streams in the region of the network afflicted by the bottleneck. However, such throttling routines tend to be applied reactively, indiscriminately, and without regard to the preferences of the various participants of the video conference.

Stemming from these problems, users often choose to simply switch off their video feed. They may also choose to mute their outgoing audio, especially if they are a passive participant in a video conference. This adversely impacts communication and interactivity during a video conference, making it difficult for other parties to detect the presence of that user.

It is against this background that the present invention has been devised.

SUMMARY

According to a first aspect of the present invention there may be provided a system for video processing. The system may be a real-time communications system and/or a video recording system. Preferably, the system is a video-conferencing system. The system may comprise at least one of: a control device and a capture device. At least one device may be a mobile device and at least the other may be a computing device.

Preferably, the control device comprises at least one of:
a networking module;
a display unit for displaying video streams;
an audio interface for generating video stream audio signals; and
a pairing module for communicatively pairing the control device with the capture device.

Preferably, the networking module of the control device is configured to establish a connection, via a communications network, with at least one recipient of a video stream transmitted by the control device. The at least one recipient of the video stream transmitted by the control device may be another participant of a video-conferencing session.

Preferably, the display device of the control device is configured to display video streams, such as those of the video-conferencing session.

Preferably, the capture device comprises at least one of:
a screen, such an electronic touch-sensitive screen;
a sensor set, including a camera; and
a pairing module for communicatively pairing the capture device with the control device; and
a telecommunications module.

Preferably, the physical size of the display unit of the control device is larger than the screen of the capture device.

Preferably, the system comprises at least one cooperation application to configure the capture device and the control device to cooperate during the performance of a video processing operation. The video processing operation may be part of a video conferencing operation. It should be noted that the configurations and instructions for cooperation, as controlled by the at least one cooperation application, can encompass situations in which the control device controls the capture device, where the capture device controls the control device, or a hybrid cooperation system in which various control responsibilities are divided between the two devices.

There may be a plurality of capture devices and/or control devices. Accordingly, the at least one cooperation application may configure the plurality of capture devices and/or control devices. Moreover, the configurations and instructions for cooperation, as controlled by the at least one cooperation application, can encompass situations in which at least one control device controls multiple capture devices, where at least one capture device controls multiple control devices, or a hybrid cooperation system in which various control responsibilities are divided between three or more devices.

The telecommunications module of the capture device may be operable to download a cooperation application. The capture device may be arranged to execute the downloaded cooperation application to control the capture device to initiate a pairing routine to enable the capture device to be communicatively paired with the control device. Preferably, the capture device is a mobile device, and its telecommunication module is a wireless telecommunication module.

Similarly, the telecommunications module of the control device may be operable to download a cooperation application. The control device may be arranged to execute the downloaded cooperation application to control the control device to initiate a pairing routine to enable the control device to be communicatively paired with the capture device.

Advantageously, the use of at least one cooperation program for pairing allows video from the camera of the capture device to be fed, via the respective pairing modules, to the control device for use in a video processing operation, such as for recording, and/or real-time video communications—such as a video conferencing session.

Moreover, the at least one cooperation application is ideally executed on at least one of the capture device and the control device so as to configure the capture device and the control device to communicatively pair for cooperation with one another, via their respective pairing modules, to perform a video processing operation that is split between the capture device and the control device.

Preferably, the video processing operation comprises performing, at the capture device, a first set of video processing tasks on video generated by the camera of the capture device.

Preferably, the video processing operation comprises transferring, from the capture device to the control device by their respective pairing modules, at least one of: video generated by the camera of the capture device, and capture-device-processed video.

Preferably, the video processing operation comprises performing, at the control device, a second set of video processing tasks. Preferably, the second set of video processing tasks are performed on the capture-device-processed video.

Preferably, the executed at least one cooperation application determines the split of video processing tasks between the capture device and the control device. Preferably, in response, the at least one cooperation application allocates those tasks by configuring the capture device to perform the first set of processing tasks, and configuring the control device to perform the second set of processing tasks.

Advantageously, this allow the cooperation application to efficiently split the processing burden between the capture device and the control device depending on their likely video processing capabilities. Moreover, the executed at least one cooperation application ideally determines the respective technical capabilities of the capture device and the control device and, in dependence on the determined technical capabilities, determines the split of video processing tasks between the capture device and the control device.

Preferably, the control device comprises a display unit, and the cooperation application configures the control device to display on the display unit a user interface (UI). Preferably, the UI has at least one UI element that is configured to receive a user input so as to:
 change settings of the camera of the capture device, such as brightness, contrast, depth of field, bokeh effect and/or image resolution;
 specify video processing tasks to be performed at the capture device and/or control device;
 display video, on the display unit, of video generated by the capture device;
 start video generation by the camera of the capture device; and/or
 stop video generation by the camera of the capture device.

Preferably, the control device and capture device are independent devices.

Preferably, the cooperation application configures the capture device and the control device to perform a pairing routine so as to communicatively pair for cooperation with one another. Preferably, the pairing routine comprises an authorisation process that ideally includes a code exchange between the control device and the capture device.

Preferably, the code exchange comprises generating and outputting as a video or audio signal, a code at one of the capture device or control device, and receiving and inputting that code at the other of the capture device or control device.

Preferably, the control device further comprises a networking module configured to establish a connection, via a communications network, with at least one recipient. Preferably, the video processing operation generates a video stream at the control device suitable for transmission, via the networking module, to the at least one recipient.

Preferably, the networking module is configured to establish a video-conferencing connection with the at least one recipient in which video streams are both transmitted and received by the control device. Preferably, the control device further comprises a display unit configured to display the video streams transmitted and received by the control device.

Preferably, the networking module of the control device is configured by the cooperation application that is downloaded and executed on the control device.

Preferably, the capture device comprises a depth sensor for generating depth information. Preferably, one of the first set of video processing tasks comprises performing a bokeh effect on video generated by the camera of the capture device in dependence on said depth information.

Preferably, the capture device is configured by the cooperation application to enter into a power minimising state following pairing of the capture device and the control device. The capture device may be configured by the cooperation application to enter into a power minimising state in dependence on determining that the capture device has been secured to a stable position, such as a tripod or other mounting device, or is no longer being manually handled by a user. Accordingly, the system may comprise such a mounting device. Preferably, the power minimising state includes darkening or switching off a screen of the capture device.

Preferably, the determination that the capture device has been secured to a stable position and/or is no longer being manually handled by a user is made by querying at least one of an inertial measurement unit ("IMU"), or a touch-sensitive screen of the capture device.

Preferably, an output of one video processing task is used as an input for another video processing task. Preferably, the video processing tasks include at least one apply effects task in which filters, effects, or overlays are applied over or to the video stream. Preferably, at least one apply effects task comprises applying images (such as logos) or text (such as subtitles) as overlays to a region of the video stream. The applied images or text may be dynamic content, such as videos or slides.

Preferably, the video processing tasks include an intelligent crop task that comprises detecting a background of a user within an uncropped video stream, and applying a cropping operation to the video stream to remove it.

Preferably, the video processing tasks include a resolution adjustment task in response to at least one of detected bandwidth and user settings.

Preferably, the video processing tasks include at least one condition detection task that comprises detection of a predetermined user behaviour. The predetermined user behaviour may include eye-contact, gestures, movement and/or talking. The predetermined user behaviour may include specific sounds. Preferably, in response to detecting the predetermined user behaviour, the at least one condition detection task comprises modifying other video processing tasks.

Preferably, the video processing tasks include a spatial sound processing task, for acoustic separation, within a virtual acoustic environment, of sound originating from different sources—such as different video conferencing participants.

Preferably, the cooperation application comprises a user interface via which a user can control the acoustic separation of sound originating from different sources.

Preferably, the system further comprises an auxiliary control device. The auxiliary control device may have similar features and functionality to that of the control device and/or capture device. The auxiliary control device may be configured to communicate with the capture device and/or the control device.

The at least one cooperation application may be configured to receive an input from the auxiliary control device and, in response, configure the capture device and/or control device to perform at least part of the video processing operation.

Preferably, the auxiliary control device has a user interface arranged to receive a user input and, in response, generate the input for receipt by the cooperation application.

Preferably, the at least one cooperation application receives an input from the auxiliary control device and, in response, configures the capture device and/or control device to:
- change settings of the camera of the capture device, such as brightness, contrast, depth of field, bokeh effect and/or image resolution;
- specify video processing tasks to be performed at the capture device and/or control device;
- start video generation by the camera of the capture device; and/or
- stop video generation by the camera of the capture device.

Preferably, the auxiliary control device comprises: a wearable device such as a smart watch and/or a peripheral device such as a MIDI controller or customisable keyboard.

Preferably, the control device further comprises a memory, and the video processing operation generates a video stream that is stored on the memory.

Preferably, the system further comprises an auxiliary processing device. The features and functionality of the auxiliary control device, the capture device, the control device and/or the auxiliary control device may be similar to one another. For example, the auxiliary processing device and the capture device may both be in the form of a mobile device. The auxiliary processing device is ideally an independent device from the capture device and control device.

By way of further example, the auxiliary processing device may comprises a telecommunication module operable to download the at least one cooperation application, the downloaded cooperation application being executable by the auxiliary processing device to perform a pairing routine to enable pairing with the capture device and the control device.

Preferably, the auxiliary processing device is configured to communicate with the capture device and/or the control device. Preferably, the at least one cooperation application is executed on at least one of the capture device, the control device and the auxiliary processing device so as to configure them to perform at least part of the video processing operation on the auxiliary processing device. Accordingly, the auxiliary processing device may be configured to perform an auxiliary set of processing tasks.

Preferably, the auxiliary processing device comprises an auxiliary pairing module for communicative pairing with at least one of the capture device and the control device, the video processing operation comprising transferring, via the auxiliary pairing module, video from the capture device and/or control device to the auxiliary processing device. Ideally, once transferred, the auxiliary processing device is configured to perform the auxiliary set of video processing tasks. Following the performance of the auxiliary set of video processing tasks, the auxiliary processing device may be configured to transfer the auxiliary-device-processed video back to the control device and/or the capture device.

Preferably, the auxiliary set of video processing tasks are performed independently to the first and/or second set of processing tasks. Ideally, the auxiliary set of video processing tasks are performed after the first set of processing tasks.

Preferably, the auxiliary set of video processing tasks include at least one of the video processing tasks described herein, such as an apply effects task, an intelligent crop task, a resolution adjustment task, a condition detection task, and/or a sound processing task.

Preferably, the executed at least one cooperation application determines the respective technical capabilities of the capture device, the control device and the auxiliary processing device, and in dependence on the determined technical capabilities, determines the split of video processing tasks between the capture device, the control device and the auxiliary processing device.

According to a second aspect of the present invention there is provided a method of performing a video processing operation. The method may comprise conducting a video conferencing operation. The method may comprise downloading and executing at least one cooperation program on to at least one of a capture device and a control device. The at least one cooperation program may comprise a mobile app that is downloadable and executable on the capture device in the form of a mobile device. The at least one cooperation program may comprise a video control program that is downloadable and executable on a control device such as a computing device.

Advantageously, the at least one cooperation program allows a capture device and control device to be configured to operate together in concert, rather than as functionally independent, standalone devices. Thus, their respective shortcomings can be synergistically offset by one another, and they can share the burden of tasks required for video processing, especially for the purposes of video conferencing, including the potential enhancement of a video stream originating from the capture device.

The method may comprise pairing a control device and the capture device. Pairing ideally enables a transfer of data between the control device and capture device. Ideally, the at least one cooperation program coordinates the pairing of the devices with subsequent data exchanged between the capture device and the control device being controlled by the at least one cooperation program.

The method may comprise determining a split of tasks for conducting a video processing and/or video conferencing operation between the capture device and the control device. Determining a split may comprise determining the relative technical capabilities of each device, and then allocating tasks to the two devices in dependence on their relative technical capabilities. To this end, the method may further comprise exchanging technical capability data between the capture device and the control device.

The method may further comprise performing the allocated tasks, or parts thereof, on each respective device.

Tasks for conducting a video processing and/or conferencing operation may comprise at least one of:
an apply effects task;
an intelligent crop task;
a resolution adjustment task;
a condition detection task; and
a sound processing task.

Advantageously, the output of one task may be used as an input for another task.

Preferably, the method may comprise at least one of:
capturing a video stream using a camera of the capture device;
performing tasks to process that video stream on the capture device;
transmission of that capture-device-processed video stream to the control device;
performing additional tasks to process that capture-device-processed video stream on the control device; and
passing the dual-processed video stream to an endpoint—for example, for use in video recording and/or real-time video communication such as video conferencing. The latter may include a video conferencing program as an endpoint, executed on the control device.

The endpoint may be a storage device. For example, the endpoint could be a memory of the control device. In this case, the dual-processed video stream is stored on the memory, encoded as a video file.

Preferably, the video processing method is suitable for video conferencing and comprises at least one of:
executing at least one cooperation program on at least one of a capture device and a control device, so as to configure the capture device and the control device to communicatively pair for cooperation with one another to perform a video processing operation;
determining, by the at least one cooperation program, a split of video processing tasks between the capture device and the control device; and
performing the video processing operation in which a first set of video processing tasks are performed by the capture device, and a second set of video processing task are performed by the control device.

According to a third aspect of the present invention there is provided a computer program comprising instructions which, when executed on at least one of a capture device and a control device, configures the capture device and the control device to communicatively pair for cooperation with one another to perform a video processing operation. The video processing operation may be that in which:
a first set of video processing tasks are performed by the capture device on video generated by a camera of the capture device;
capture-device-processed video is transferred from the capture device to the control device; and
a second set of video processing tasks are performed by the control device on the capture-device-processed video.

It will be understood that features and advantages of different aspects of the present invention may be combined or substituted with one another where context allows.

For example, the features of the system described in relation to the first aspect of the present invention may be provided as part of the method described in relation to the second aspect of the present invention, and/or the computer program of the third aspect and vice-versa.

Furthermore, such features may themselves constitute further aspects of the present invention, either alone or in combination with others.

For example, the features of the capture device, the cooperation application, the control device, the auxiliary control device, the auxiliary processing device may themselves constitute further aspects of the present invention. Similarly, functions or tasks, such as the apply effects task, the intelligent crop task, the resolution adjustment task, the condition detection task and the sound processing task may also constitute further aspects of the present invention.

BRIEF DESCRIPTION OF THE DRAWINGS

In order for the invention to be more readily understood, embodiments of the invention will now be described, by way of example only, with reference to the accompanying drawings in which.

DETAILED DESCRIPTION

Figure 1:
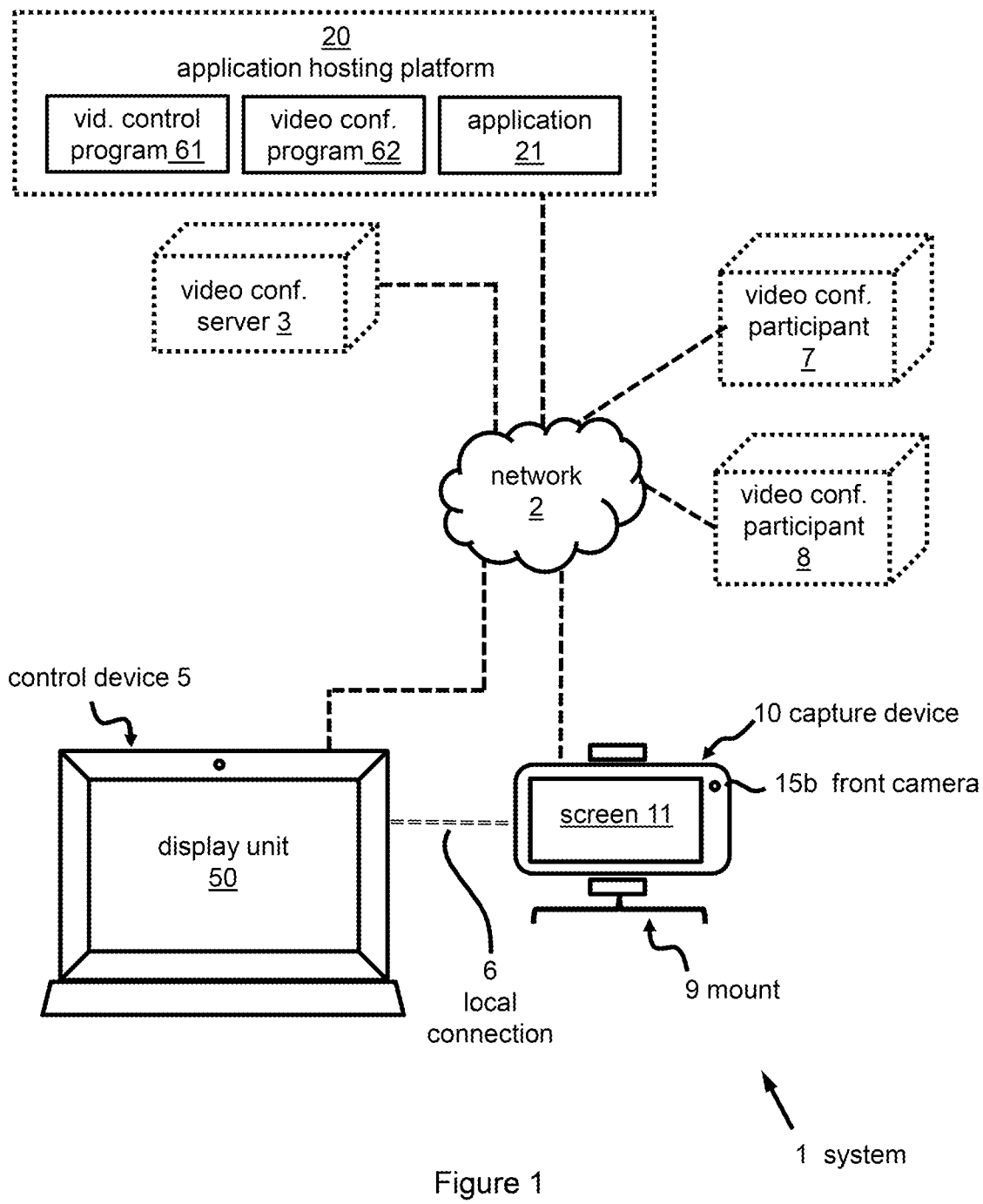
FIG. 1 shows a schematic view of a video processing system according to various embodiments of the present invention.

FIG. 1 shows a schematic view of a video processing system 1, according to a first exemplary embodiment of the present invention. In this particular embodiment, the video processing system 1 is in the form of a video conferencing system 1. It should be noted that every component shown in and described with reference to FIG. 1 is not necessarily an essential part of embodiments of the invention—they are merely included for completeness. Notably, some of the components may be simply used by or interact with the video conferencing system 1 rather than necessarily being integral parts of the system 1 itself. For example, a video conferencing server 3, video conferencing participants 7, 8, and an application hosting platform 20, each of which is shown in dotted outline in FIG. 1, are considered to be components that interact with the system 1.

In the embodiment shown in FIG. 1, the video conferencing system 1 comprises at least part of a communication network 2, an application ("app") 21, a capture device 10 in the form of a mobile device 10 that is configured by the app 21, a video control program 61, a video conferencing program 62, and a control device 5, in the form of a computing device 5, that is configured by the video control program 61 and the video conferencing program 62.

The app 21, and the video control program 61 are each specific instances of a cooperation application, as will be described below, that allow the mobile device and computing device to cooperate with one another in the performance of a video processing operation, as required for video conferencing.

Figure 4:
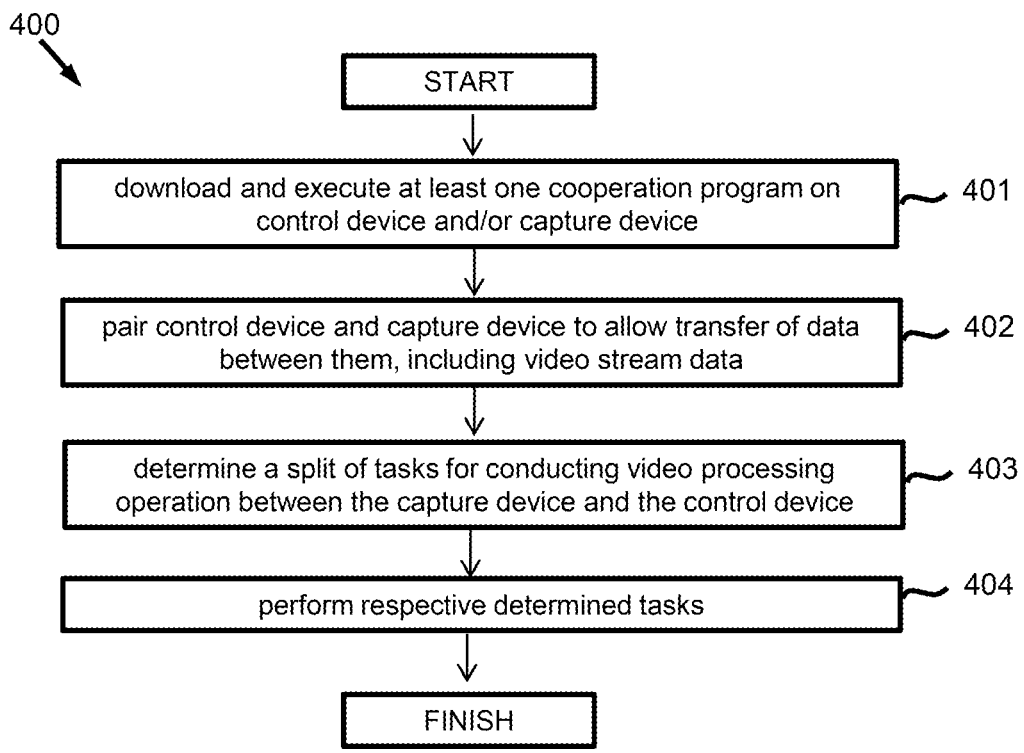
FIG. 4 is a flow diagram of a general video processing method according to various embodiments of the present invention, the processing being suitable for use, in particular, for a video conferencing operation performed by the system of FIG. 1.

In general, the system 1 is configured to perform a video processing method 400, a generalised overview of which is described in FIG. 4.

FIG. 4 is a flow diagram of a general video processing method 400 according to various embodiments of the present invention, including the embodiment of FIG. 1.

In a first step 401, the method comprises downloading and executing at least one cooperation program on to at least one of the capture device 10 and the control device 5.

For example, in the embodiment of FIG. 1, the at least one cooperation program comprises both an app 21 and a video control program 61. The app 21 is downloaded and executed on the mobile device 10 (which acts as the capture device). The video control program 61 is downloaded and executed on the computing device 5 (which acts as the control device).

Advantageously, the at least one cooperation program allows a capture device and a control device to be configured to operate together, rather than as independent standalone devices. Thus, their respective shortcomings can be synergistically offset by one another, and they can share the burden of tasks required for video processing, including the potential enhancement of a video stream—ideally originating from the capture device.

In a second step 402, the method 400 comprises pairing the control device 5 and the capture device 10 to allow a transfer of data between them. The at least one cooperation program coordinates the pairing of the devices with subsequent data exchanged between the capture device 10 and the control device 5 being controlled by the at least one cooperation program.

A third step 403 comprises determining a split of tasks for conducting a video processing operation between the capture device 10 and the control device 5. In particular, the at least one cooperation program may first determine the relative technical capabilities of each device, and allocate tasks across the two devices accordingly. To this end, the at least one cooperation program exchanges technical capability data between the devices 5, 10.

A fourth step 404 comprises performing the allocated tasks on the respective device 5, 10.

In the embodiment shown in FIG. 1, this includes capture of video stream using a camera of the mobile device 10, performing tasks to process that video stream on the mobile device 10—as controlled by the app 21, transmission of that mobile-processed video stream to the computing device 5, performing additional tasks to process that mobile-processed video stream on the computing device 5—as controlled by the video control program 61, and then passing the dual-processed video stream to an endpoint for use in video conferencing, such as the video conferencing program 62 also running on the computing device 5.

Referring back to FIG. 1, a more detailed description of the components and function of the system 1 will now be described.

As discussed, the control device 5 runs a video conferencing program 62, which constitutes an endpoint for the video stream(s) handled by the app 21 and video control program 61.

Examples of video conferencing programs 62 include those generally known under services such as Zoom®, Facetime®, Google® Meet, Microsoft® Teams etc. It should be noted video conferencing programs 62 may also be in the form of web applications.

Each video conferencing program 62 would traditionally rely on the underlying control device 5 to pass a video stream to it, for example, derived from an integrated webcam and microphone of the control device 5. The video conferencing program 62 then at least partly governs the transmission of that video stream to other video conferencing participants 7, 8, and likewise governs the reception of other video streams from those other video conferencing participants 7, 8 to the control device 5.

In some cases, communications passing between all video conferencing participants 5, 7, 8 are routed via, or partly governed by, the video conferencing server 3. For the avoidance of doubt, a video stream generally comprises both video and audio channels.

In the present embodiment, the video conferencing program 62 is instead interfaced with the video control program 61 from which it is fed the video stream.

An application hosting platform 20 initially hosts the app 21 which is subsequently downloaded, via the network 2, to the capture device 10 and executed on the capture device 10 so as to configure it for operation. Similarly, the application hosting platform also hosts the video control program 61, and the video conferencing program 62 which are downloaded by the control device 5 and executed by it.

The application hosting platform 20 may be in the form of a single platform, or a combination of several different platforms—such as the Apple® Appstore®, the Google® Play™ Store, and/or the Microsoft® Store—but merely for simplicity they are represented as a single entity in FIG. 1.

The communications network 2 interconnects the components of the system 1, as well as the components that interact with the system 1. In various embodiments the network may be embodied by a wired and/or wireless local area network (LAN), peer-to-peer wireless connections (e.g. using at least one of Bluetooth and direct Wi-Fi), a wide area network (WAN) such as the Internet, or a combination of these.

Moreover, certain components of the system 1 shown in FIG. 1 may reside on a single device and so, in this case, the communications network 2 may include intra-device communication channels.

Leading on from this, certain components shown in FIG. 1 may be provided as part of or otherwise integrated with others. For example, the video conferencing server 3 and the application hosting platform 20 may be implemented on a common dual-functionality server. Moreover, components may not necessarily be in the form of a single physical machine or device. For example, the term "server" may encompass, for example, a distributed or "cloud" computing service, engine, service or platform.

Also, for simplicity and clarity, only single exemplary instances of most components of the system 1 are shown in FIG. 1. Nonetheless, in practice, the system 1 will typically include at least thousands of capture devices 10 and control devices 5. Likewise, video conference participants 7, 8 may be equally numerous.

The capture device, in the present embodiment is a mobile device 10. This is in the form of a smartphone having a touch-sensitive screen 11 on which can be displayed user-interface (UI) elements. These can communicate a state of the mobile device 10 (or system 1) to a user. The UI elements also provide a means by which a user can input information to the mobile device 10. This is done via interacting with those UI elements—for example via a touch-interaction with the touch-sensitive screen 11. The UI elements include a virtual electronic keyboard, as is known in the art, for inputting data such as alphanumeric characters.

The capture device is shown in FIG. 1 as having the screen 11 and a front camera 15b positioned on a common major front face of the capture device 10 facing outwards in the same direction. Accordingly, images, including video, captured by the front camera 15b can be displayed immediately on the screen 11, thereby providing a user with a "virtual mirror".

In such an arrangement, the capture device 10 is able to be used in a standalone configuration for video operations such as video conferencing in that the video input (camera 15b) and output (screen 11) face in the same direction. However, this has the drawback of the screen size 11 being relatively small. This is particularly relevant for the purposes of video-conferencing where a small screen size makes it relatively difficult to clearly see all other participants 7, 8 of a video conference.

In contrast, the control device 5 has a larger display 50 but, if provided with a camera at all, will typically be provided with a poor-quality camera relative to the capture device 10, often with a large DOF and a low resolution. Accordingly, the control device 5 can be used in a stand-alone configuration for video conferencing via the execution of the video conferencing program 62, but this has many drawbacks as discussed in the background section.

The present invention relates, at least in part, to pairing the capture device 10 with the control device 5 so their respective shortcomings can be synergistically overcome. To achieve this, the system 1 further comprises a local connection 6 via which the capture device 10 and the control device 5 can be communicatively coupled to one another. In alternative embodiments, they may be communicatively coupled in other ways—for example, a wireless connection can take the place of the local wired connection 6.

Figure 2:
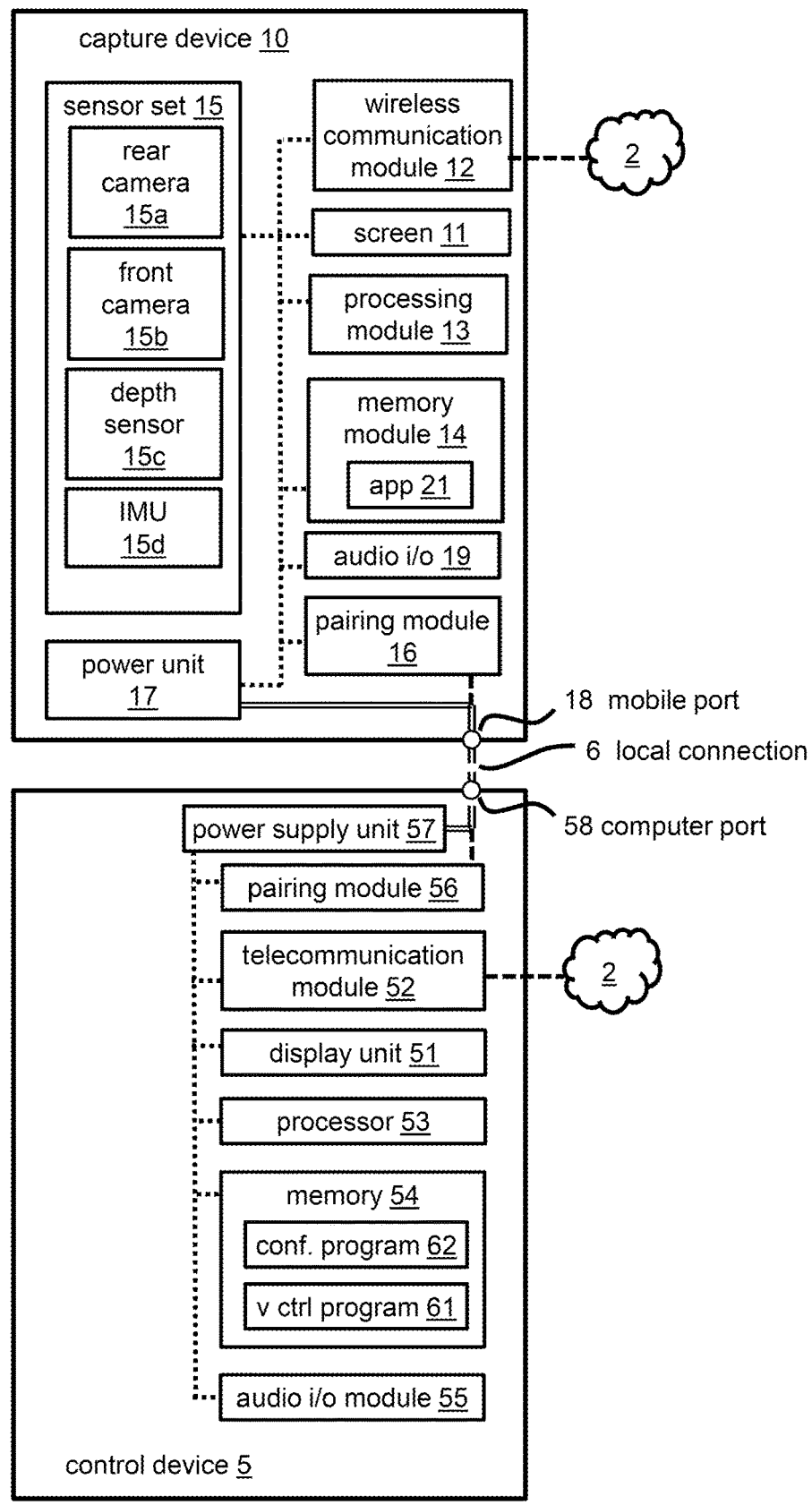
FIG. 2 is a schematic block diagram of a capture device and a control device of the system of FIG. 1, communicatively coupled to one another.

FIG. 2 is a schematic block diagram of the communicatively coupled capture device 10 and control device 5.

The capture device 10 comprises a wireless communication module 12 for interfacing with the network 2, a processing module 13, and a memory module 14. The capture device 10 also comprises a sensor set 15. By way of non-limiting example, the sensor set 15 comprises a rear camera 15a, a front camera 15b, a depth sensor 15c, and an inertial measurement unit (IMU) 15d. The IMU 15d includes a gyroscope and accelerometer, allowing the capture device 10 to infer its orientation and movement in space.

The rear camera 15a is of higher quality and resolution than the front camera 15b, and is mounted at the rear major face of the capture device 10 alongside the depth sensor 15c (both not visible in FIG. 1). The output of the depth sensor 15c and the rear camera 15a are temporally and spatially synchronised, at least in part, such that the generation of an image frame by the rear camera 15a coincides with a corresponding depth map frame generated by the depth sensor 15c. Accordingly, an otherwise 2D image frame can be enhanced with depth data, with different regions or pixels of the image being assigned as being further away or closer to the capture device 10 than others.

The capture device 10 further comprises a pairing module 16 for pairing with the control device 5, and a power unit 17. The power unit 17 comprises a battery and battery monitoring and charging circuitry. In the present embodiment, the pairing module 16 and power unit 17 are electrically coupled to a mobile port 18 via which the capture device 10 can be connected to the control device 5 via a cable, such that the local connection 6 is a wired connect that allows transfer of both power and data between the two devices 5, 10.

The memory module 14 is structured so as to transiently or persistently store data, and is where an operating system, file system and applications of the capture device 10 are stored. Applications, such as the app 21 are retrieved from the memory and passed to the processing module 13 for execution at run-time.

The capture device 10 also has an audio input/output 19, in the form of a microphone array, and internal speakers. The audio output typically also includes a stereo output interface—such a headphone jack, or wireless audio transmitter—via which stereo sound signals can be transmitted to stereo headphones or other stereo sound generation means.

The capture device 10 further comprises other functional components that are typically common in smart-phone and tablet devices, but are not explicitly and individually shown in the drawings. By way of non-limiting example, these other components include other members of the sensor set 15, such as an NFC (near-field communication) component, a light intensity sensor, a proximity sensor and a compass. A timer, tactile transducers (e.g. vibration transducer), and a clock are also provided. The components of the capture device 10 are functionally and communicatively linked to one another as schematically indicated by the dotted lines in FIG. 2. The capture device 10 may also comprise additional communication modules (e.g. Wi-Fi, BLE/Bluetooth, cellular etc.), to allow communication with other components or sub-components of the system 1. For example, the capture device 10 may be connectable via a wireless communication module to an auxiliary control device, such a smart watch.

Referring back to FIG. 1, the system 1 is configured to make the app 21 available for download. The provision of the app 21 is ideally via the network 2 from the third-party application hosting platform 20. In some examples, a hyperlink or similar may be provided via UI elements of the capture device 10, which—when selected by a user—guides the capture device 10 to the location of the appropriate application 21 hosted by the app hosting platform 20. This can then be downloaded via the wireless communication module 12 on to the memory module 14 of the capture device 10.

The app 21, when run or managed by the capture device 10, and typically in conjunction with the app hosting platform 20, is configured to automatically detect when the application requires updating, and either automatically updates itself, or may first prompt a user to affirm that an update should take place.

The downloading and execution of the app 21 provides functionality otherwise not available to that capture device 10. In particular, the app 21 provides some of the functionality of the video processing system 1 performed by the capture device 10, including the intelligent processing of video stream data.

Referring back to FIG. 2, likewise, the control device 5 comprises many equivalent components, such as a telecommunication module 52 for interfacing with the network 2, a processor 53, an audio i/o module 55 and memory 54. The audio i/o module 55 also includes a stereo output interface, similar to that of the capture device 10.

The control device 5 is configured to allow a user to download, via the telecommunication module 52, both a video conferencing program 62 and a video control program 61 to the memory where each can be simultaneously executed by the control device 5. These programs provide some of the functionality of the video processing system 1—in this case performed by the control device 5.

The control device 5 also comprises its own pairing module 56, and power supply unit 57, which are each coupled to a computer port 58, such as a USB port. Again, this can be used to connect the control device 5 to the capture device 10 via the wired local connection 6, as described above, that allows transfer of both power and data between the two devices 5, 10. The control device 5 may further comprise or be connectable with an auxiliary control device, such as a keyboard or another peripheral.

The control device 5 typically has a larger battery, and/or is typically plugged into a mains power supply. Therefore, when the control device 5 and the capture device 10 are connected via the local connection 6, it is envisaged that the power supply unit 57 of the control device 5 supplies power, via the computer port 58 and local connection 6 to the power unit 17 of the capture device 10 to allow charging of the battery of the capture device 10. In this way, it is advantageously possible to run both devices 5, 10 continuously without requiring both to be connected to mains power via a separate cable. Furthermore, the wired local connection 6 is generally capable of achieving higher data transfer rates than other means, such as wireless data transfer.

Despite these advantages, it should be pointed out that alternative embodiments of the invention allow the control device 5 and the capture device 10 to be communicatively linked to one another via wireless connections, for example via the network 2, with each device having its own independent power source.

Each device 5, 10 is initially unlinked to one another. However, following the download and execution of the app 21 by the capture device 10, and the download and execution of the video control program 61 by the control device 5, at least one of the capture device 10 and control device 5, configured by their respective app 21 or video control program 61, initiates a pairing routine with the other.

In the present invention, the pairing routine may include providing instructions to a user to physically connect the devices 5, 10 to one another via the local connection 6, such that the pairing modules 16, 56 are communicatively linked to one another via respective ports 18, 58. These instructions may be provided via the screen 11 of the capture device 10, and/or the display unit 50 of the control device.

The pairing routine may comprise an authorisation process to ensure that a user is authorised to use both the control device 5 and the capture device 10 in conjunction with one another. This is less important for the current embodiment in which a direct wired location connection 6 is used, than in alternative embodiments in which a wireless connection takes the place of the wired location connection.

The authorisation process may comprise a key or code exchange between the control device 5 and the capture device 10 in a way that maximises the likelihood that both devices are under the control of the same authorised user. The authorisation process may comprise outputting a code or signal at one device, for receipt at the other device.

For example, a time-limited pseudo-randomly generated 2D machine-readable barcode may be displayed via the display unit 50 of the control device 5, that is to be captured and decoded by a camera of the capture device 10 for use in the pairing routine. This serves as a mechanism to ensure that both devices are physically close to one another, and so implicitly under the control of the same authorised user.

Another example is via outputting an audio signal from a speaker of one device, to be detected by a microphone by the other. Again, the audio signal is time-limited, and generated pseudo-randomly to minimise the chance of fraudulent pairing, and the range of the soundwave is small enough to ensure closeness of the two devices 5, 10.

Following connection, the video control program 61 and app 21 coordinate with one another to allow exchange of data via the local connection 6. This includes the exchange of command data, video stream data, and also technical capability data.

Advantageously, command data exchange allows a user interacting with the user interface of one device to control the settings and behaviour of both devices 5, 10. For example, it is primarily envisaged that a user can operate the control device 5 to control the settings of the capture device 10. This conveniently removes the need for the user to interact with the capture device 10 via its own GUI, as presented by the relatively small screen 11. This leads to a better user experience, negating the need for the user to attempt to physically control two devices simultaneously. If an auxiliary control device is connected to the capture device 10 or the control device 5, this can serve as an extension of the user interface: for example, allowing a user to control the behaviour of both devices via a keyboard, a MIDI controller, a smart watch, or similar.

This also usefully facilitates the user in reorienting the capture device 10 such that the front face and screen 11 face away from the user, and the rear face of the capture device 10, bearing the rear camera 15*a*, and depth sensor 15*c* face towards the user.

As discussed above, the rear camera 15*a* is of better quality than both the front camera 15*b* of the capture device 10, and is also better than any integrated camera that the control device 5 may be provided with. Thus the rear camera 15*a* is capable of generating better quality video data.

Additionally, the depth sensor 15*c* allows images—and so video streams—from the rear camera 15*a* to be accurately populated with depth information as described above. Accordingly, more efficient processing of the video stream to add shallow depth-of-field effects (e.g. bokeh effect) can be achieved. Specifically, blur effects can be applied to pixels, or groups of pixels within the images generated by the rear camera 15*a* in dependence on their corresponding depth value, as detected by the depth sensor 15*c*. This removes the relatively high processing burden of applying image analysis techniques to a video stream for the purposes of blurring a background, for example. Accordingly, such effects can be applied near-instantaneously—leading to lower lag in a video conference.

The capture device 10 can thus be effectively utilised as an efficient high-quality independent webcam, and is ideally is secured to a position adjacent to the control device 5. A video stream, captured and processed by the capture device 10 can be transmitted via the local connection 6 to the control device 5 for use in a video conference, as governed by the video conferencing program 62.

To this end, the system 1 may comprise a mount 9 for steadying the position and orientation of the capture device 10. The app 21 configures the capture device 10 to detect when it is secured in this matter. Specifically, the capture device 10 is configured by the app 21 to query the IMU 15*d*, and in response determine whether the capture device 10 has been secured to a stable position and orientation, and so is suitable for use as an independent webcam. Additional sensors 15 of the capture device 10 may also be queried, for example to verify that it is no longer being handled by a user to operate its user interface via the screen 11. The capture device 10 may further be configured by the app 21 to detect connectivity between the control device 5 and capture device 10, and coordination with the video control program 61 of the control device 5, so that command data can be transferred as discussed above. When these conditions are determined, the app 21 may automatically configure the capture device 10 to enter a power-minimising state. In particular, the screen 11 of the capture device 10 may be switched off, or otherwise darkened to minimise power consumption of the capture device. Naturally, if the app 21 and the video control program 61 are coordinated, the command to enter a power minimising state may originate from the video control program 61. In such a power-minimising state, the capture device 10 is nonetheless still capable of transmitting a video feed to the control device, and also performing processing tasks. If video processing is not required, for example, if a video conference is not currently active, the power-minimising state may further disable cameras and other video-processing component of the capture device entirely to further minimise power consumption.

Beneficially, both the control device 5 and the capture device 10 are able to split the burden of processing tasks required to conduct a video processing. However, the processing capabilities of each may vary. Accordingly, the app 21 and the video control program 61 configure their respective devices 5, 10 to perform a technical capability check, and so determine a set of technical capability data for each device 5, 10. The check may comprise a benchmarking operation, that includes testing the status of various components of each device, such as the processor, memory, battery level, etc. The check may comprise determining a make and model of each device, and referring to a technical capability lookup table preloaded into or remotely accessible by the app 21 or video control program 61.

Following on from this, the technical capability data can be transmitted between the devices and compared with one another to determine the relative performance of the control device 5 and the capture device 10. Moreover, tasks for conducting a video processing operation, such as a video conferencing operation can be determined and split across the control device 5 and capture device 10, in dependence on their determined relative technical capabilities.

In certain alternatives, the system may have multiple control devices and/or capture devices. Moreover, the system may comprise at least one auxiliary processing device (e.g. another mobile device). In any case, each device may be configured to cooperate for the purposes of video processing, and so the tasks for video processing being split across three or more devices. One specific alternative uses a digital camera as the capture device, a computing device as the control device, and a mobile device as the auxiliary processing device, for example.

The split of tasks can also be controlled, at least in part, via user preferences set by the user within the app 21 and/or video control program 61. These preferences may relate to enabling or disabling tasks for enhancing or otherwise altering the video stream fed, for example, to the video conferencing program 62.

For example, one of the tasks may be an "apply effects" task, in which filters, effects, or overlays are applied over or to the video stream. For example, this may comprise changing the brightness, contrast and colour balance of the video stream. The apply effects task may further comprise applying static images, such as watermarks, as overlays to a region of the video stream. Alternatively, dynamic images may be provided that change over time—for example, subtitles or presentation artefacts/slides. To this end, dynamic images may be pre-prepared and cued to output in time with certain user actions (e.g. a certain key press). Alternatively, subtitles may be automatically generated via a speech-to-text algorithm in response to the audio input from a user. A text translation algorithm may be further applied, allowing a presenter in one language to communicate with others in a different language.

Another one of the tasks may be a "intelligent crop" task for minimising the display of background surrounding a user. The task may comprise detecting a background of a user within an uncropped video stream, and applying a cropping operation to the video stream to remove it. Ideally this is a rectangular crop, and may be based on at least one of: image analysis techniques, and depth cues from the depth sensor 15c. Advantageously, as the high-quality, high resolution rear camera 15a supplies the uncropped video stream, the resulting cropped video stream fed to the endpoint (e.g. video conferencing program 62) will have an acceptable quality. Accordingly, the cropping task effectively allows for automatic panning and zooming within the field of view of the rear camera 15a.

Another of the tasks may be a "resolution adjustment" task. Under certain circumstances where the available bandwidth across the network between the control device 5 and one or more video stream recipients (e.g. video conferencing participants 7, 8) is limited, it can be wasteful of that bandwidth to attempt to transmit the full resolution of the video stream available from the high quality rear camera 15a. In these circumstances, it is useful to adjust the resolution of the video stream sent from the control device 5, the resolution being dependent on the detected bandwidth. i.e. a higher bandwidth can support a transmission of video streams of greater resolution.

In some circumstances, it can also be beneficial to perform the resolution adjustment task in response to other conditions, such as user settings. For example, a user may wish to maintain a certain level of privacy or passivity during a video conference. Accordingly, the user interface of the app 21 and/or video control program 61 provides the user with a resolution adjustment element, such as a slider, allowing the user to specify minimum and/or maximum resolutions. Furthermore, a user may assign a hot-key to toggle or otherwise adjust the resolution of a video feed.

Furthermore, other conditions are also those that can be automatically determined by the app 21 and/or video control program 61. To this end another set of tasks may be "condition detection" tasks. These can be used to detect a condition for use in controlling other tasks.

For example, one condition detection task may comprise detection of a predetermined user behaviour, especially that may be indicative of the type of participation in real-time video communications, such as a video conference. To perform this task, image and/or sound analysis techniques can be used to detect predetermined user behaviour such as eye-contact, gestures, movement and talking. In response, certain actions may be taken. For example, if the condition detection tasks determines that a user is talking then, in response, the resolution adjustment task may increase the resolution of the video stream, whereas if the user is silent and relatively still, and so implicitly a passive or listening participant of a video conference, the resolution of the video stream may be decreased.

Advantageously, this specifically addresses a problem set out in the background section: it allows users who are passive participants of a video conference to positively indicate their presence without sacrificing their need for privacy, and also without over-utilising potentially scarce bandwidth. However, when users take a more active role in a video conference, they can be allocated with a greater resolution. Accordingly, bandwidth allocation can be dynamically allocated across the participants of a video conference, changing in correspondence with the level of activity/passivity exhibited by the participants, with the most active, at any one time, being allocated greater bandwidth. This greatly facilitates communication during the video conference, as greater clarity is achieved from the most important video stream, at any one time. This addresses a further issue of passive users opting to simply switch off their video feed to avoid unwanted attention—thus the interactivity of a video conference can be maintained.

Another related condition detection task may comprise detecting specific sounds, as detected by a microphone of the control device 5 and/or capture device 10, to filter out, filter through, or used as the basis for controlling the resolution adjustment task. Again, sound analysis technique can be used to discern the type of sound, and choose an appropriate action in response.

Another one of the tasks may be a "spatial sound processing" task, for acoustic separation, within a virtual acoustic environment, of sound originating from different video conferencing participants 7, 8.

Specifically, the task comprises receiving an audio component of the video stream from each video conferencing participant 7, 8, and processing them to generate a multi-channel (typically stereo) output audio signal. The processing comprises applying different filters to each different audio component, such that playing the multichannel output audio signal via multichannel speakers, headphones, or the like, provides a listener with the perception that audio from different participants are spatially separated from one another within the virtual acoustic environment. This can be achieved even if those participants are utilising monophonic audio input hardware. To this end, the spatial sound processing task may comprise determining an appropriate location for each participant, and applying the filters accordingly.

For example, this may be automatically matched to the position of each video feed on the display unit 50 of the control device such that images of video participants shown to the left (or right) of the display are likewise placed toward the left (or right) in the virtual acoustic environment. This improves intelligibility of conversation, and interactivity of the video conference.

Furthermore, the filters can be applied to place different sounds within each single audio components to different locations within the virtual acoustic environment, on the basis of the differences in those sounds. For example, if two different speakers in the same room are using a single device for video conferencing (and so are both sharing the same audio channel), then the location of each speaker within the virtual acoustic environment can be controlled on the basis of the difference in the pitch of their voice.

Naturally, this extends to other sounds: for example, background noise of machinery, children, vehicles, etc. originating from the same location of a video conferencing participant can be spatially isolated from that participant.

Figure 3:
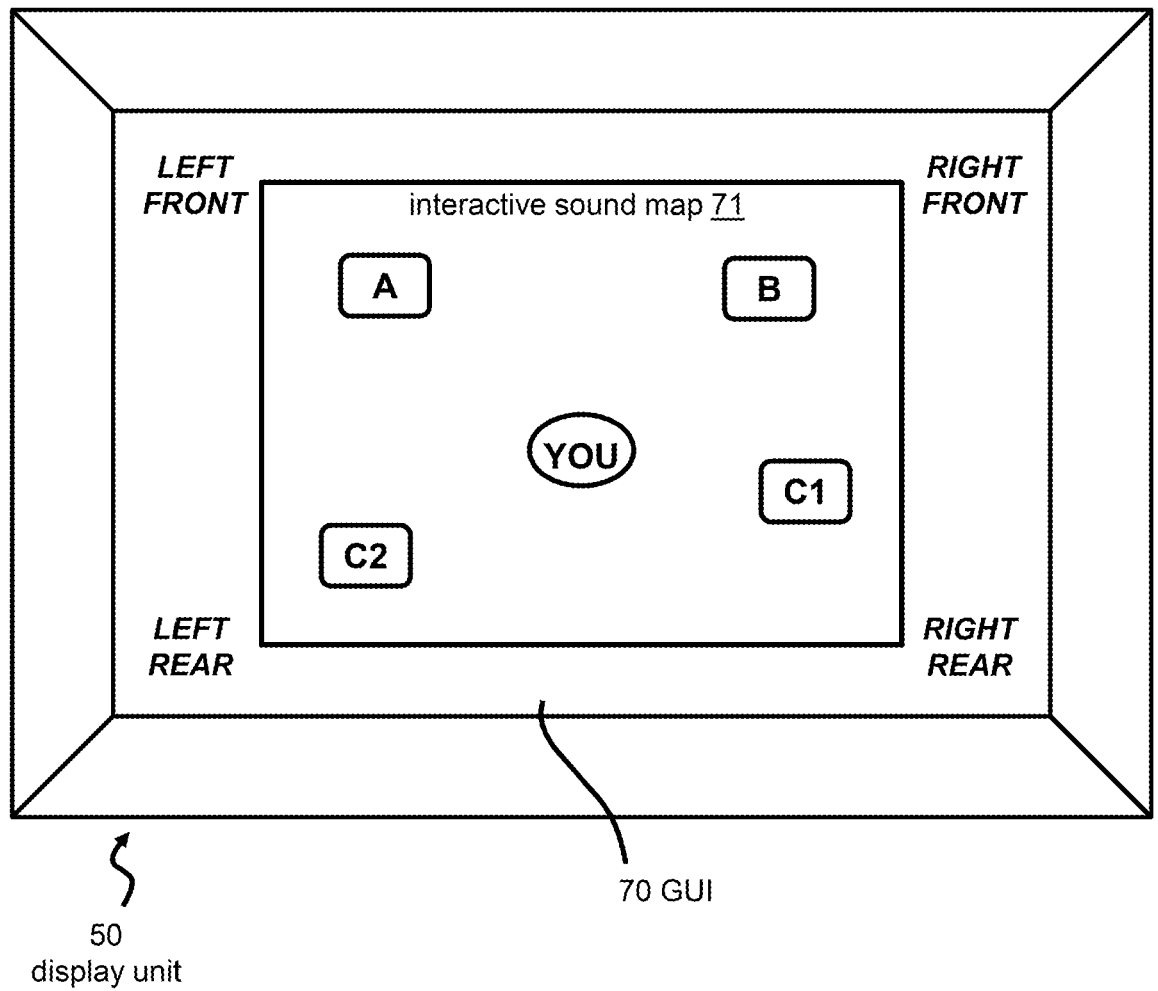
FIG. 3 is a schematic view of a screen of the control device of FIG. 1, the screen displaying a user interface for controlling sound.

Referring to FIG. 3, the video control program 61 may further provide, via a graphical user interface 70 displayed on the display unit 50, an interactive map 71 of the virtual acoustic environment in which audio from different video conferencing participants A, B or even different sounds originating from the same video participant C1, C2 are represented as icons relative to a listener (YOU). The icons are movable (e.g. draggable) relative to the listener, and in response the spatial sound processing task filters the different sounds sources to modify the virtual acoustic environment to match that represented by the map 71.

As discussed, these above-described tasks can be performed by the control device 5, the capture device 10, or a combination of the two. For example, the capture device 10, configured by the app 21, may instead provide a GUI for controlling the virtual acoustic environment, and this, in turn, may influence the operation of the spatial sound processing task performed on the control device 5—as configured by the video control program 61.

By transmitting technical capability data between the devices for comparison, an efficient split of tasks for conducting video processing (including audio processing) can be achieved, which is particularly important for real-time video communications such as video streaming and/or video conferencing. Accordingly, embodiments of the invention can provide an improved video processing system and method.

Although the invention has been described in conjunction with specific embodiments thereof, it is evident that many alternatives, modifications and variations will be apparent to those skilled in the art. Accordingly, it is intended to embrace all such alternatives, modifications and variations.

What is claimed is:

1. A video processing system suitable for at least one of: video communications and video recording, the system comprising:
   a control device;
   a capture device connectable via a local connection to the control device, the capture device having a sensor set including a camera for generating video and a capture device pairing module for communicatively pairing the capture device with the control device, the control device comprising a control device pairing module for communicatively pairing the control device with the capture device, and a display unit for displaying video streams;
   at least one cooperation application, the at least one cooperation application being executed on, and configuring, at least one of the capture device and the control device to be operable by the local user to communicatively pair the capture device and the control device for cooperation with one another, via the respective capture device and control device pairing modules, and to perform a control operation and a video processing operation;
   wherein the control operation comprises determining the respective technical capabilities of the capture device and the control device and, in dependence on the determined technical capabilities:
      displaying on the display unit of the control device a user interface having at least one UI element;
      receiving a user input, from the local user, on the at least one UI element; and,
      in response to receiving the user input on the at least one UI element, and in dependence on the respective technical capabilities of the capture device and the control device, execute at least one of:

changing settings of the camera of the capture device;
specifying video processing tasks to be performed by the capture device;
specifying video processing tasks to be performed by the control device;
displaying video, on the display unit, of video generated by the capture device;
starting video generation by the camera of the capture device; and
stopping video generation by the camera of the capture device.

2. The system of claim 1, wherein the video processing operation is split between the capture device and the control device and comprises:
performing, at the capture device, a first set of video processing tasks on video generated by the camera of the capture device;
transferring over the local connection, by their respective pairing modules, that capture-device-processed video from the capture device to the control device; and
performing, at the control device, a second set of video processing tasks on the capture-device-processed video.

3. The system of claim 1, wherein the executed at least one cooperation application determines at least one of:
the split of video processing tasks between the capture device and the control device and, in response, allocates those tasks by configuring the capture device to perform the first set of video processing tasks, and configuring the control device to perform the second set of video processing tasks; and
the respective technical capabilities of the capture device and the control device and, in dependence on the determined technical capabilities, determines the split of video processing tasks between the capture device and the control device.

4. The system of claim 1, wherein the cooperation application configures the control device to display on the display unit a user interface (UI) having at least one UI element that is configured to receive a user input and, in response, execute at least one of:
changing settings of the camera of the capture device, including at least one of brightness, contrast, depth of field, bokeh effect and image resolution;
specifying video processing tasks to be performed by at least one of the capture device and control device;
displaying video, on the display unit, of video generated by the capture device; starting video generation by the camera of the capture device; and
stopping video generation by the camera of the capture device.

5. The system of claim 1, wherein the control device and capture device are independent, standalone devices, the capture device comprising a screen that is physically smaller than the display unit of the control device.

6. The system of claim 1, wherein the cooperation application configures the capture device and the control device to perform a pairing routine so as to communicatively pair for cooperation with one another, the pairing routine comprising an authorisation process that includes a code exchange between the control device and the capture device.

7. The system of claim 1, wherein:
the control device further comprises a networking module configured to establish a connection, via a communications network, with at least one recipient;
the video processing operation generates a video stream at the control device suitable for transmission, via the networking module, to the at least one recipient;
the networking module is configured to establish a video-conferencing connection with the at least one recipient in which video streams are both transmitted and received by the control device; and
the control device further comprises a display unit configured to display the video streams transmitted and received by the control device.

8. The system of claim 1, wherein at least one of the capture device and the control device comprises a respective telecommunication module operable to download the at least one cooperation application, the downloaded cooperation application being executable by at least one of the capture device and control device to perform a pairing routine, thereby to enable the capture device and the control device to be communicatively paired with one another.

9. The system of claim 1, wherein the capture device comprises a depth sensor for generating depth information, and one of the first set of video processing tasks comprises performing a bokeh effect on video generated by the camera of the capture device in dependence on said depth information.

10. The system of claim 1, wherein the capture device is configured by the cooperation application to enter into a power minimising state following pairing of the capture device and the control device, and in dependence on determining that the capture device is no longer being manually handled by a user, the power minimising state including at least one of: darkening a screen of the capture device, and switching off a screen of the capture device.

11. The system of claim 1, wherein an output of one video processing task is used as an input for another video processing task.

12. The system of claim 1, wherein the video processing tasks include at least one of: an apply effects task in which at least one of: filters, effects, overlays, image overlays, logo overlays, text overlays, and subtitles are applied to at least a region of the video;
an intelligent crop task that comprises detecting a background of a user within an uncropped video, and applying a cropping operation to the video to remove it;
a resolution adjustment task in response to at least one of detected bandwidth and user settings;
a condition detection task that comprises detection of at least one of a predetermined user behaviour, and specific sounds, and in response modifying other video processing tasks; and
a spatial sound processing task, for acoustic separation, within a virtual acoustic environment, of sound originating from different sources.

13. The system of claim 1 further comprising an auxiliary control device configured to communicate with at least one of the capture device and the control device, the at least one cooperation application being configured to receive an input from the auxiliary control device and, in response, configure at least one of the capture device and control device to perform at least part of the video processing operation.

14. The system of claim 13, wherein the auxiliary control device has a user interface arranged to receive a user input and, in response, generate the input for receipt by the cooperation application.

15. The system of claim 13, wherein the at least one cooperation application receives an input from the auxiliary control device and, in response, configures at least one of the capture device and control device to execute at least one of:

changing settings of the camera of the capture device, including at least one of brightness, contrast, depth of field, bokeh effect and image resolution;

specifying video processing tasks to be performed by at least one of the capture device and control device;

displaying video, on the display unit, of video generated by the capture device;

starting video generation by the camera of the capture device; and stopping video generation by the camera of the capture device.

16. The system of claim 13, wherein the auxiliary control device comprises at least one of: a wearable device, a smart watch, a peripheral device, a MIDI controller, and a customizable keyboard.

17. The system of claim 1, wherein the control device further comprises a memory, and the video processing operation generates a video stream that is stored on the memory.

18. The system of claim 1, further comprising an auxiliary processing device configured to communicate with at least one of the capture device and the control device, wherein the at least one cooperation application is executed on at least one of the capture device, the control device and the auxiliary processing device so as to configure them to perform at least part of the video processing operation on the auxiliary processing device, the auxiliary processing device performing an auxiliary set of video processing tasks.

19. The system of claim 18, wherein:
the auxiliary processing device comprises an auxiliary pairing module for communicative pairing with at least one of the capture device and the control device, the video processing operation comprising transferring, via the auxiliary pairing module, video to the auxiliary processing device to perform the auxiliary set of video processing tasks; and the auxiliary set of video processing tasks are performed independently to the first and second set of video processing tasks, the auxiliary set of video processing tasks being performed after the first set of video processing tasks.

20. A video processing method suitable for at least one of: video communications and video recording, comprising:
executing at least one cooperation program on at least one of a capture device and a control device, the capture device being connectable via a local connection to the control device, the at least one cooperation application being executed on, and configuring, at least one of the capture device and the control device to be operable by the local user to communicatively pair the capture device and the control device for cooperation with one another, and to perform a video processing operation and a control operation, the capture device including a camera, the control device including a display unit, the control operation including the steps of:
determining the respective technical capabilities of the capture device and the control device and, in dependence on the determined technical capabilities:

displaying on the display unit of the control device a user interface having at least one UI element;

receiving a user input, from the local user, on the at least one UI element; and in response to receiving the user input on the at least one UI element, and in dependence on the determined technical capabilities of the capture device and the control device, execute at least one of:

changing settings of the camera of the capture device;

specifying video processing tasks to be performed by the capture device;

specifying video processing tasks to be performed by the control device;

displaying video, on the display unit, of video generated by the capture device;

starting video generation by the camera of the capture device; and stopping video generation by the camera of the capture device.

21. A non-transitory computer readable medium storing program comprising instructions that, when executable on at least one of a capture device and a control device, the capture device including a camera, the control device including a display unit, the capture device being connectable via a local connection to the control device, the instructions configuring, at least one of the capture device and the control device to be operable by a local user to communicatively pair the capture device and the control device for cooperation with one another, and to perform a video processing operation and a control operation, the control operation including the steps of:
determining the respective technical capabilities of the capture device and the control device and, in dependence on the determined technical capabilities:

displaying on the display unit of the control device a user interface (UI) having at least one UI element configured to receive a user input;

receiving a user input, from the local user, on the at least one UI element; and in response to receive the user input, and in dependence on the determined technical capabilities of the capture device and the control device, execute at least one of:

changing settings of the camera of the capture device;

specifying video processing tasks to be performed by the capture device;

specifying video processing tasks to be performed by the control device;

displaying video, on the display unit, of video generated by the capture device;

starting video generation by the camera of the capture device; and stopping video generation by the camera of the capture device.

* * * * *